J. H. OSTRANDER.
EYEGLASS CONSTRUCTION.
APPLICATION FILED JULY 9, 1915.

1,261,279.

Patented Apr. 2, 1918.

Witnesses
Victor J. Siljander
Charles W. Hills by

Inventor
James H. Ostrander
Charles W. Hills Atty

UNITED STATES PATENT OFFICE.

JAMES H. OSTRANDER, OF CHICAGO, ILLINOIS.

EYEGLASS CONSTRUCTION.

1,261,279.  Specification of Letters Patent.  Patented Apr. 2, 1918.

Application filed July 9, 1915. Serial No. 38,837.

*To all whom it may concern:*

Be it known that I, JAMES H. OSTRANDER, a citizen of the United States, and a resident of the city of Chicago, in the county of Cook and State of Illinois, have invented certain new and useful Improvements in Eyeglass Construction; and I do hereby declare that the following is a full, clear, and exact description of the same, reference being had to the accompanying drawings, and to the numerals of reference marked thereon, which form a part of this specification.

This invention relates to an improved eye glass construction wherein the nose piece acts efficiently to clamp yieldably upon the nose of a wearer, maintaining the eye glasses securely in place, yet spacing the same the proper distance from the eyes, and also affording means for conveniently handling the eye glasses.

It is an object, therefore, of this invention to provide a construction wherein a maximum resilient effect is obtained for retaining the eye glass upon the nose of a wearer without the use of complicated constructions or the addition of supplemental springs.

It is also an important object of this invention to construct an eye glass nose piece wherein a maximum bearing surface is provided for contact upon the nose of the wearer, and with a simple resilient arrangement for holding the contact members pressed against the nose to hold the eye glass in position thereon.

It is furthermore an important object of this invention to provide an eye glass construction wherein a single bar of resilient metal is bent to afford a double spring arrangement which thrusts the bearing or contact pieces of the eye glass closely upon the nose, a secondary spring construction preventing an undue stressing of the primary spring members of the device.

It is finally an object of this invention to provide a simple type of nose piece for eye glasses easily and cheaply constructed, and yet acting efficiently to support and maintain the eye glasses properly upon the nose of a wearer.

The invention (in a preferred form) is illustrated in the drawings and hereinafter more fully described.

Figure 4:
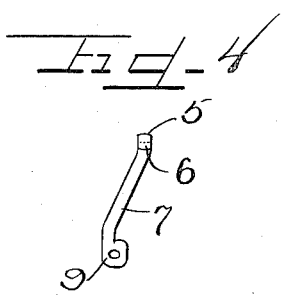
Fig. 4 is an end view of the member shown in Fig. 3.

The lenses of a pair of eye glasses are each denoted by the reference numeral 1, and secured on one thereof is a lens retaining ring 2, and around the other, a lens retaining ring 3, the shape of said rings conforming to the outline of the lenses, and the ring in the latter case being provided with an eye 4, through which an eye glass cord or chain may be attached. The lenses are held resiliently connected to one another by a bridge piece comprising a bar 5, of resilient metal folded as indicated by the reference numerals 6, with the extremities 7, of said bar directed inwardly toward one another and angled as clearly shown in Fig. 2, out of the vertical plane of the bar 5, and at their ends engaged upon pins 8, secured upon the respective lens retaining rings 2 and 3. As clearly shown in Fig. 4, the ends of the extremities 7, of said bridge member, which are denoted by the reference numeral 9, are bent downwardly at an angle into a vertical position, and are apertured for insertion over and attachment upon said pins 8.

Figure 1:
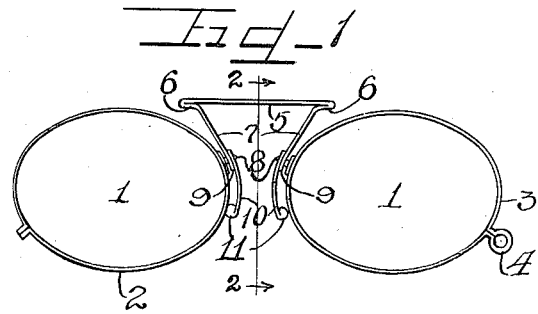
Figure 1 is a front view of a device embodying the principles of my invention.
Figure 2:
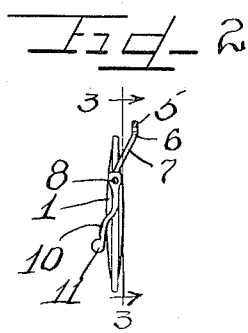
Fig. 2 is a section taken on line 2—2 of Fig. 1.
Figure 3:
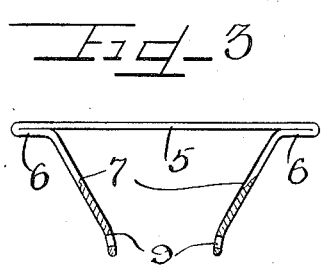
Fig. 3 is a fragmentary section taken on line 3—3 of Fig. 2.

Also attached upon said pins 8, and disposed over the ends 9, of the bridge member, are resilient curved bearing or contact members 10, so arranged that the convex portions thereof are directed toward one another, as clearly shown in Fig. 1, and furthermore said contact members are angled inwardly, as clearly shown in Fig. 2, and at their ends terminate in an enlarged and rounded extremity 11. The long horizontal bar member 5, acts as a stiffening member between the lenses, and the inwardly offset extremities 7, thereof, which are resilient, act as primary spring members to maintain the lenses thrust toward one another. The folded portions 6, of said bridge member, however, are of course, due to their position and arrangement, secondary spring members requiring an excess stress upon the primary spring members 7, to cause the folded portions 6, to spring downwardly away from the bridge bar 5. It is readily apparent, therefore, that when the lenses are separated from one another beyond a certain amount opposed to the resilience of the spring members 7, the secondary spring elements 6, are brought into play, thus preventing the excessive stress being entirely withstood by the members 7. Of course the curved resilient nose bearing members 10, adapt themselves to the curvature of the nose, insuring a considerable area of contact, and also an even application of the spring pressure.

Reference to Fig. 2, will clearly disclose that the extremities of the nose contact pieces 10, are considerably offset from the bridge bar 5, for the reason that the extremities of said bridge bar are angled inwardly, and the nose contact pieces 10, are also angled still further inwardly, so that the eye glass is attached closely and inwardly upon the nose in such a position that the contact pieces are almost invisible, and yet the lenses themselves are spaced a sufficient distance from the eye as to not inconvenience the wearer.

I am aware that various details of construction may be varied through a wide range without departing from the principles of this invention, and I therefore do not purpose limiting the patent granted otherwise than necessitated by the prior art.

I claim as my invention:

In an eye glass construction of the class described a horizontal bridge bar, portions thereof bent inwardly beneath the same lying closely thereto affording secondary spring elements, the extremities of said bar angled inwardly and downwardly affording primary spring elements, and lenses attached upon said extremities.

In testimony whereof I have hereunto subscribed my name in the presence of two subscribing witnesses.

JAMES H. OSTRANDER.

Witnesses:
    CHARLES W. HILLS, Jr.,
    GEORGE R. MOORE.